R. NIELSEN.
ICE CREAM SPOON.
APPLICATION FILED AUG. 19, 1907. RENEWED SEPT. 11, 1909.
1,132,871.
Patented Mar. 23, 1915.
2 SHEETS—SHEET 1.
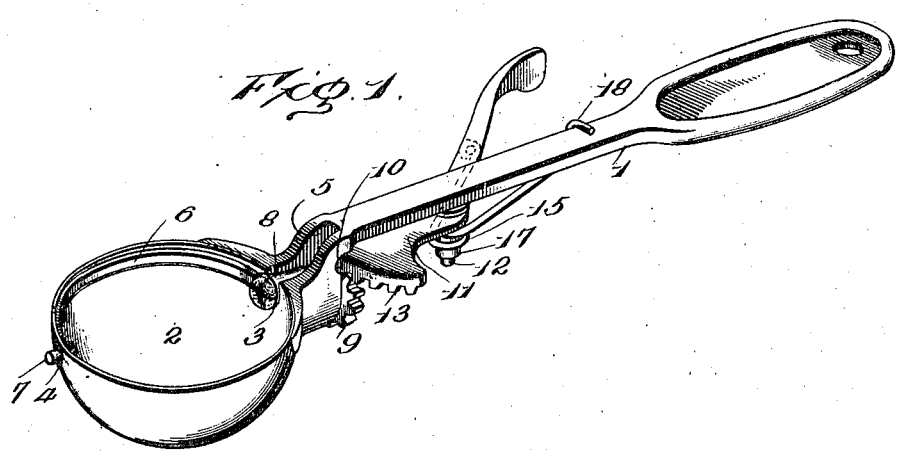
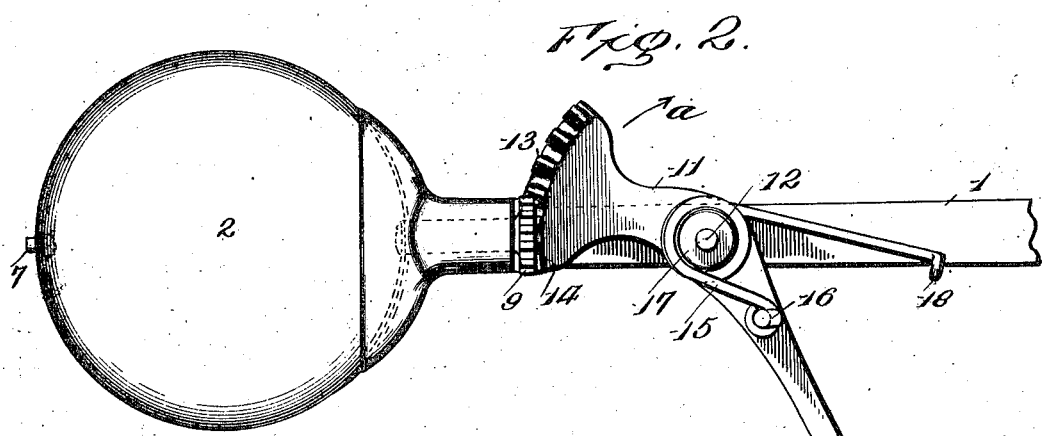
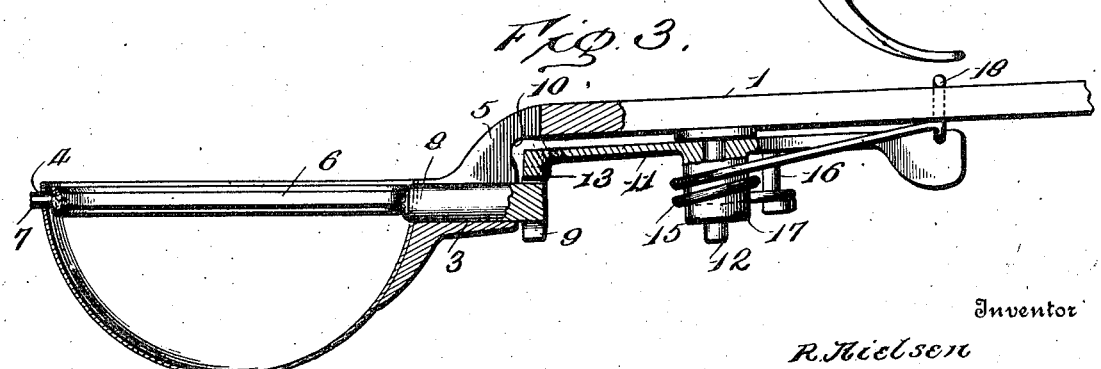
Witnesses
J. S. Messer
W. A. Williams
Inventor
R. Nielsen
By Jn. Imire
Attorney R. NIELSEN.
ICE CREAM SPOON.
APPLICATION FILED AUG. 19, 1907. RENEWED SEPT. 11, 1909.
1,132,871.
Patented Mar. 23, 1915.
2 SHEETS—SHEET 2.
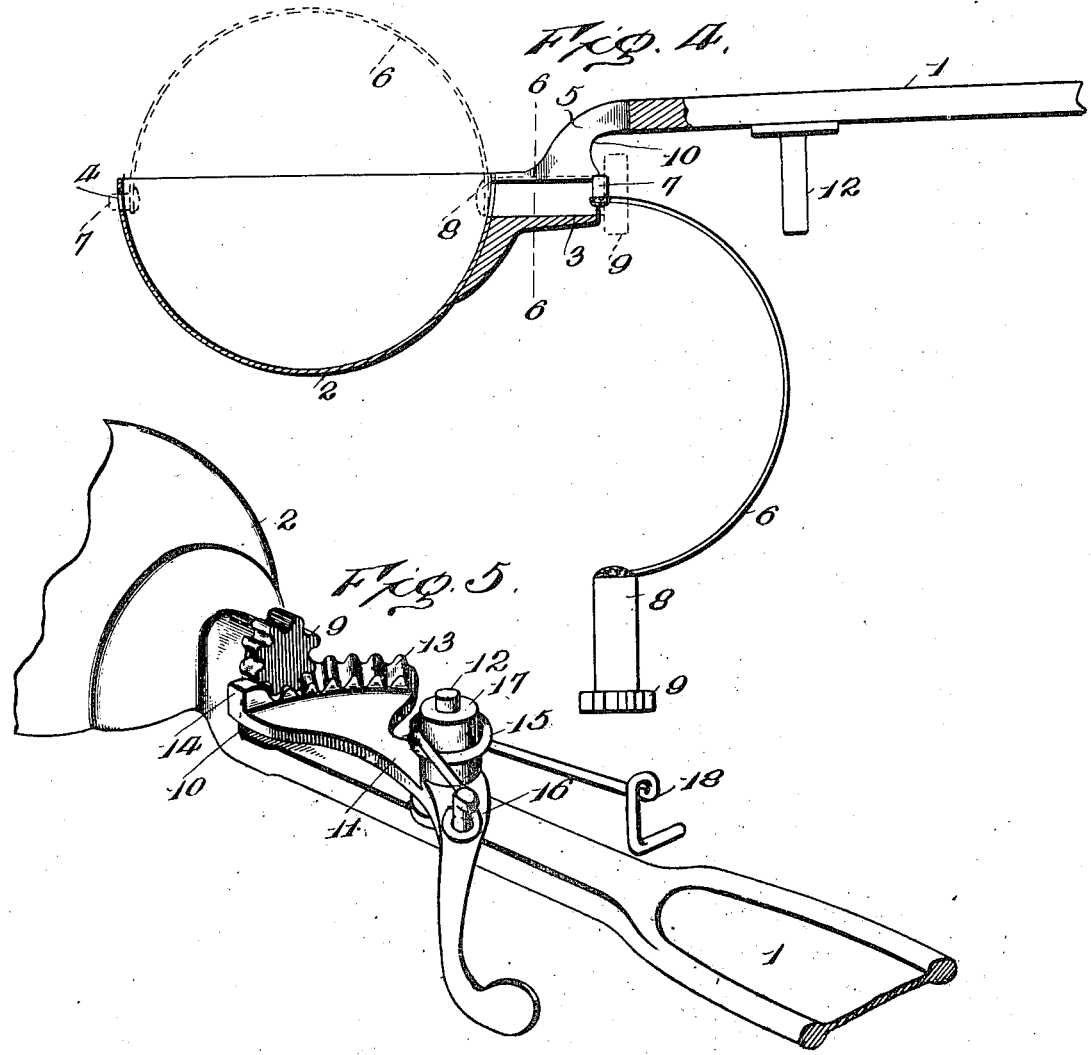
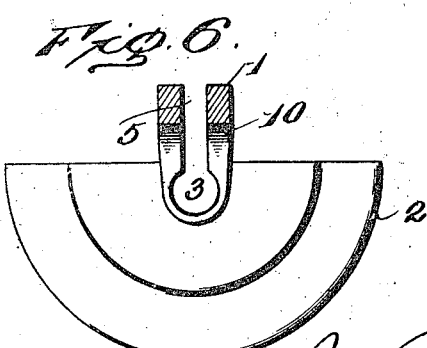

UNITED STATES PATENT OFFICE.

RASMUS NIELSEN, OF TROY, NEW YORK, ASSIGNOR TO THE GILCHRIST COMPANY, OF NEWARK, NEW JERSEY, A CORPORATION OF NEW JERSEY.

ICE-CREAM SPOON.

1,132,871.     Specification of Letters Patent.     Patented Mar. 23, 1915.

Application filed August 19, 1907, Serial No. 389,289. Renewed September 11, 1909. Serial No. 517,288.

*To all whom it may concern:*

Be it known that I, RASMUS NIELSEN, a citizen of the United States, residing at Troy, in the county of Rensselaer and State of New York, have invented certain new and useful Improvements in Ice-Cream Spoons, of which the following is a specification.

This invention relates to improvements in ice cream spoons.

The prime object of the invention is to provide a spoon structure which may be readily taken to pieces for cleaning, to avoid particles of cream gathering and eventually becoming sour.

According to my invention, I provide a spring adapted to be attached and detached, holding the ordinary finger piece to the handle, which in turn holds the scraper and its coöperating parts in assembled position.

Other objects and advantages will be hereinafter referred to and particularly pointed out in the claims.

In the drawings Figure 1 is a perspective view of my improved spoon. Fig. 2 is a bottom plan view of the same. Fig. 3 is a vertical central section. Fig. 4 is a view similar to Fig. 3, but showing the scraper being removed. Fig. 5 is an inverted perspective view, the retaining spring being released, to permit of the parts being separated. Fig. 6 is a detail cross section on the line 6—6, Fig. 4.

1, indicates a handle, having at one end a bowl 2. An elongated restricted bearing 3, is formed at the junction of the handle and bowl, and in line with it in the bowl is a second bearing 4. The bearing 3, is a very essential feature of my present invention, as it enables me to conveniently remove the scraper from the bowl. Communicating with the bearing is a slot 5, somewhat narrower than the bearing proper, as clearly shown in Fig. 6, whereby the spindle of the scraper is retained in the bearing.

Supported in the bearings 3, and 4, is a scraper 6, having trunnions 7, and shaft or spindle 8. The scraper fits snugly within the bowl and is adapted to be partially revolved therein to remove the cream, as will be readily understood. The trunnion 7, engages bearing 4, while the spindle or shaft 8, fits in the bearing 3. On the free end of trunnion 8, is a gear wheel 9, which by reason of the offset 10, in the handle is under the latter.

A finger piece 11, is pivoted on a post 12, extending from the handle, and it is provided at one end with a finger grip and at its opposite end with a series of teeth 13, which engage the pinion 9. At one end of the row of teeth is a stop 14, to limit the movement of the finger piece in one direction. One end of a spring 15, is slipped over a pin 16, extending from the finger piece, and is then coiled around a boss 17, also on the finger piece, and the free end is bent to form a hook 18, to slip over one edge of the handle to lock the parts in position. When assembled, the hooked end 18, of the spring, is forced over one edge of the handle which places said spring under tension, and thereby throws the finger piece in direction of arrow *a*, Fig. 2, and brings the stop 14, against the pinion. By pressing the finger grip toward the handle, the spring is compressed and the scraper is moved in the usual manner in the bowl, and when released assumes normal position as shown in Fig. 1.

When it is desired to take the spoon to pieces to clean it, the hooked end 18, of the spring is forced out of engagement with the handle, and thence downwardly therefrom, when it will immediately assume a normal or inactive position, and may be readily withdrawn from the boss 17, and pin 16, respectively, and the finger piece turned out of engagement with the pinion. The pinion being now free the scraper is turned upwardly as shown in dotted lines in Fig. 4, and is moved toward the handle to remove the trunnion 8, from its bearing, and is then turned so as to withdraw the scraper proper through the slot 5, as shown in full lines in Fig. 4. The parts being now separated they may be conveniently cleaned, and again put in place by reversing the movement just described, and placing the spring under tension by slipping the hook 18, over the handle. As illustrated in Fig. 3, a portion of the spring adjacent hook portion 18 lies in the path of the finger lever 11 so that when the device is assembled the movement of the lever during the working stroke will be limited. The spring performs a dual function, to wit: holds the parts together, and serves as a means for operating the scraper in one direction. When the finger piece is turned in one direction by the operator, the spring returns it to normal position.

What I claim is:

1. An ice cream spoon comprising a handle and a bowl, a slot being formed between said handle and bowl, a scraper having a pinion, said scraper being of such width as will pass through the slot, a finger piece having teeth which engage the pinion, and a spring for locking the finger piece and scraper to the bowl and also serving to operate said scraper in one direction.

2. An ice cream spoon comprising a bowl formed with a bearing, a handle formed with a bearing and a slot communicating therewith, a scraper having trunnions mounted in the bearings and having a pinion, a finger piece having teeth which engage the pinion, means for mounting the finger piece on the handle, and a spring engaging the finger piece and handle for holding the parts together and also serving to move the scraper in one direction, the scraper being withdrawn from the bowl through the slot when said spring is released.

3. An ice cream spoon comprising a handle and a bowl, a slot formed between said handle and bowl, a scraper having a pinion, said scraper being of such width as will pass through the slot, a finger piece having teeth which engage the pinion, and a spring for operating the scraper in one direction.

4. An ice cream spoon comprising a bowl, a scraper having a pinion, a handle, a finger piece pivoted to the handle and having teeth which mesh with the pinion, a spring which locks the scraper and the finger piece to the bowl and the handle and also serves to move the scraper in one direction, and a slot formed between the handle and the bowl for the passage of the scraper when the tension of the spring is released.

5. An ice cream spoon comprising a bowl and a handle formed with bearings, a slot formed adjacent to and communicating with one of the bearings for the passage of the scraper, a pinion on the scraper, a finger piece pivoted to the handle and having teeth which mesh with the pinion, and a spring which positions the finger piece to the handle and thereby holds the trunnions in their bearings and also serves to move the scraper in one direction, said scraper being removable through the slot when the scraper is removed.

6. An ice cream spoon comprising a bowl, a removable scraper, a handle, and means for operating the scraper, the bowl having an opening through which the scraper may be removed.

7. An ice cream spoon comprising a bowl and handle, the bowl having two bearings in line with the handle, one of which is open at the top, a scraper operating in the bowl and having a trunnion and spindle, the trunnion and spindle operating in the bearings, the open bearing being formed to prevent the spindle moving upwardly when the scraper is in normal position in the bowl, said bearing being located to permit movement of the trunnion in direction of the handle to disengage it from its bearing, whereby the scraper may be removed from the bowl, and means for operating the scraper.

8. An ice cream spoon comprising a bowl, a removable scraper, a handle, a bearing, means for operating the scraper, said bearing being provided with means for preventing the removal of the scraper when in a normal position in the bowl, but permitting of removal of the scraper through said bearing when said scraper is in an abnormal position.

9. An ice cream dipper comprising a bowl, a removable scraper, means including an extension on the scraper and an opening formed with a reduced passage for holding the scraper in a normal operative position in the receptacle, the opening and passage permitting of the removal of the scraper from the bowl only when said scraper is turned from a normal operative position, and means for operating the scraper.

10. An ice cream spoon comprising a bowl, a scraper, means for operating the scraper, including a spring which acts to lock the scraper and the finger piece to the bowl and the handle and also serves to move the scraper in one direction, and a slot formed between the handle and the bowl for the passage of the scraper when the tension of the spring is released.

11. In an ice cream disher, the combination of a bowl, a handle on the bowl, a removable scraper working in the bowl, a spindle for the scraper, a restricted bearing for the spindle, said scraper being formed to pass through the restricted bearing when removing it from the bowl, and means for operating the spindle.

12. In an ice cream disher, the combination of a bowl, a handle on the bowl, a removable scraper working in the bowl, a spindle for the scraper, a trunnion on the scraper, bearings for the trunnion and the spindle, one of said bearings having a restricted portion, said scraper and trunnion being formed to pass through the restricted bearing when removing the scraper from the bowl, and means for operating the spindle.

13. In an ice cream disher, the combination of a bowl, a handle on the bowl, a removable scraper working in the bowl, a spindle for the scraper, a restricted bearing for the spindle, said scraper being formed to pass through the restricted bearing when removing it from the bowl, a pinion removable with and mounted on the spindle, and a lever for rotating the pinion.

14. In an ice cream disher, the combination of a bowl, a handle on the bowl, a scraper rotatable in the bowl, a spindle on the scraper and an open bearing for the spindle, said bearing having a fixed part to hold the spindle against transverse movement, said spindle and scraper being removable, the opening in the bearing permitting longitudinal movement of the spindle and scraper.

15. In an ice cream disher, the combination of a bowl, a handle, a resilient scraper rotatable in the bowl and provided with a trunnion, a spindle on the scraper, a bearing in the bowl for the trunnion, and an open bearing for the spindle having a fixed part to hold the spindle against transverse movement, the opening in the bearing permitting longitudinal movement of the spindle and scraper in the direction of the handle to withdraw the trunnion from its bearing in the bowl when the scraper is in one certain position.

16. In an ice cream disher, the combination of a bowl, a handle on the bowl, a removable scraper, a spindle on the scraper, and an open bearing for the spindle formed to hold the spindle against transverse movement, the spindle and scraper being removable, the opening in the bearing permitting the scraper to pass therethrough so that the spindle and scraper may be moved longitudinally in removing the scraper and spindle.

17. In an ice cream spoon, the combination of a bowl and a handle, an undercut open bearing, a scraper and a shaft, the one being of less width than the other, said scraper operating in the bowl and the shaft operating in the bearing, said open bearing permitting of the removal of the shaft and scraper, and means to control the rotation of the shaft and scraper.

18. An ice cream spoon comprising a bowl and handle, a scraper in the bowl, a pinion rotatable with the scraper, a finger piece having teeth which engage with the pinion to rotate the scraper, a spring for operating the scraper in one direction and serving to hold the finger piece on the handle.

19. An ice cream spoon comprising a handle and a bowl, a bearing formed between said handle and bowl, a scraper having a pinion, said scraper being of such width as to be removable in part through the bearing, a finger piece having teeth which engage the pinion, and a spring for operating the scraper in one direction.

20. An ice cream spoon comprising a handle and a bowl, a bearing formed between said handle and bowl, a scraper, said scraper being of such width as to be removable in part through the bearing, and means for operating the scraper.

21. An ice cream disher comprising a bowl formed with two alined bearings, a scraper operating in the bowl, said scraper having a trunnion and a spindle which operate in the alined bearings, teeth on the spindle, a pivoted finger piece carrying teeth which engage with the teeth on the spindle, means for normally holding the teeth in mesh to swing the scraper across the bowl, said means being manually operable to permit disengagement of the teeth whereby the scraper may be manually rotated to a position out of the bowl, while the trunnion and spindle remain in the bearings to permit cleaning of the bowl.

22. An ice cream disher comprising a bowl formed with two alined bearings, a scraper operating in the bowl, said scraper having a trunnion and a spindle which operate in the alined bearings, teeth on the spindle, a pivoted finger piece carrying teeth which engage with the teeth on the spindle, means for normally holding the teeth on the spindle in operative relation with the finger piece, said means being manually operable to permit disengagement of the scraper from operable relation with the finger piece whereby the scraper may be manually rotated to a position out of the bowl, while the trunnion and spindle remain in the bearings to permit cleaning of the bowl.

23. An ice cream disher comprising a bowl, an open sided bearing, a scraper movable within the bowl, a spindle extending from the scraper and journaled in the bearing, means for operating the scraper, and detachable means for permitting of the disconnection of the operating means from the scraper, whereby the scraper may be positioned opposite the open side of the bearing to be in part removable therethrough and the spindle moved longitudinally out of the bearing.

24. In an ice cream disher, the combination of a bowl, a handle on the bowl, a scraper rotatable in and removable from the bowl, a lever for rotating the scraper pivoted to the handle, means having fixed relation to the bowl and precluding removal of the scraper from the bowl during the normal working stroke of the scraper and permitting withdrawal of the scraper from the bowl when the scraper is rotated to a certain abnormal position relatively to said means and while the lever remains in connected relation to the handle.

25. In an ice cream disher, the combination of a bowl, a handle on the bowl, a scraper rotatable in and removable from the bowl, a lever for rotating the scraper, a spindle fixed to the scraper, and means through which the spindle extends having fixed relation to the bowl and precluding removal of the scraper from the bowl during the normal working stroke of the scraper and permitting withdrawal of the scraper from the bowl when the scraper is rotated to a certain abnormal position and while the lever remains in connected relation to the frame, the spindle being movable longitudinally through said means when the scraper is in said abnormal position.

26. In an ice cream disher, the combination of a bowl, a scraper rotatable in and removable from the bowl, said bowl being provided with fixed means preventing removal of the scraper during its normal working stroke and permitting removal of the scraper from the bowl when it is rotated to a certain abnormal position relatively to said fixed means, and mechanism for rotating the scraper.

27. In an ice cream disher, the combination of a bowl, a scraper rotatable in and removable from the bowl, a spindle fixed to the scraper, said bowl being provided with fixed means through which the spindle extends preventing removal of the scraper during its normal working stroke and permitting removal of the scraper from the bowl when it is rotated to a certain abnormal position, and mechanism for rotating the spindle, the latter being movable longitudinally through said means when the scraper is in said abnormal position.

28. In an ice cream disher, the combination of a bowl, a scraper rotatable in and removable from the bowl, and mechanism for rotating the scraper, said bowl being provided with a portion having a restricted passage which precludes displacement of the scraper from the bowl except when the scraper is rotated to one position relatively to said passage.

29. In an ice cream disher, the combination of a bowl, a scraper rotatable in and removable from the bowl, a spindle on the scraper, and mechanism for rotating the scraper, said bowl being provided with a portion through which said spindle extends, having a restricted passage which precludes withdrawal of the scraper except when the scraper is rotated to one position relatively to said passage, said spindle being movable longitudinally when the scraper is in said position.

30. In an ice cream disher, the combination of a bowl, a scraper rotatable in and removable from the bowl, a spindle attached to the scraper, means having fixed relation to the bowl for causing the spindle to be held against longitudinal movement during a normal working stroke of the scraper, said means permitting withdrawal of the scraper from the bowl and longitudinal movement of the spindle with the scraper at one point of the rotation of the scraper, and a lever for rotating the spindle.

31. In an ice cream disher, the combination of a bowl, a scraper rotatable in and removable from the bowl, a spindle attached to the scraper, means through which the spindle extends having fixed relation to the bowl and in which the spindle is held against longitudinal movement during a normal working stroke of the scraper and which is formed to permit longitudinal movement of the spindle through said means at one point of the rotation of the scraper, and a lever for rotating the spindle.

In testimony whereof I affix my signature in presence of two witnesses.

RASMUS NIELSEN.

Witnesses:
L. H. GILES,
RASMUS J. SCHOTT.